（12）United States Patent
Obara et al.

(10) Patent No.: US 7,155,492 B2
(45) Date of Patent: Dec. 26, 2006

(54) METHOD AND SYSTEM FOR CACHING NETWORK DATA

(75) Inventors: Kiyohiro Obara, Hachioji (JP); Ryo Watanabe, Tokyo (JP); Yoshinobu Sueno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 10/214,184

(22) Filed: Aug. 8, 2002

(65) Prior Publication Data

US 2003/0217114 A1 Nov. 20, 2003

(30) Foreign Application Priority Data

May 14, 2002 (JP) .............................. 2002-137919

(51) Int. Cl.
*G06F 3/00* (2006.01)
*G06F 13/10* (2006.01)

(52) U.S. Cl. ...................... 709/217; 709/217; 709/321; 709/310; 709/331; 709/324; 710/3; 710/4; 710/5; 710/6; 710/11; 710/62; 345/680; 345/681; 345/685

(58) Field of Classification Search ................ 709/203, 709/212, 217–229, 321, 310, 331; 710/52, 710/3–6, 11, 62; 711/117–118, 113; 714/5–7, 714/112; 345/680, 681, 685

See application file for complete search history.

(56) References Cited

U.S. PATENT DOCUMENTS

| 5,881,229 A | * | 3/1999 | Singh et al. | ................. 709/203 |
| 6,047,319 A | * | 4/2000 | Olson | .......................... 709/223 |
| 6,370,614 B1 | * | 4/2002 | Teoman et al. | ............. 711/113 |
| 6,598,174 B1 | * | 7/2003 | Parks et al. | ..................... 714/6 |
| 6,675,228 B1 | * | 1/2004 | Bahrs et al. | ................. 719/318 |
| 6,918,113 B1 | * | 7/2005 | Patel et al. | ................... 717/178 |

* cited by examiner

*Primary Examiner*—David Wiley
*Assistant Examiner*—Jude Jean-Gilles
(74) *Attorney, Agent, or Firm*—Reed Smith LLP; Stanley P. Fisher, Esq.; Juan Carlos A. Marquez, Esq.

(57) ABSTRACT

In prefetch caching program implementation for hiding the delay of data access via a network, the operation of the existing applications with the prefetch program must branch, depending on whether data to access is on the cache and it is necessary to add branch processing to the data access process. In the disclosed invention, means for caching data on a device driver level in a client system and means for storing cached data into an external storage unit are provided. Cache control is accomplished by means for sending cache control commands such as "flush the cache" to the client from the outside of the client and means for executing received cache control commands within the client. Data access delay over a network can be hidden by caching.

14 Claims, 9 Drawing Sheets

| CACHE DISK ID (19) | CACHE DISK BLOCK No. (20) | NUMBER OF CACHE DISK BLOCKS ALLOCATED FOR DATA (21) | iSCSI DISK ID (22) | iSCSI DISK BLOCK No. (23) | NUMBER OF iSCSI DISK BLOCKS ALLOCATED FOR DATA (24) | SERIAL NUMBER (25) |
|---|---|---|---|---|---|---|
| 0 | 0 | 10 | 0 | 0 | 10 | 0 |
| 0 | 10 | 8 | 0 | 88 | 8 | 1 |
| 0 | 18 | 20 | 0 | 20 | 20 | 2 |
| ... | ... | ... | ... | ... | ... | ... |
| 0 | 1020 | 15 | 0 | 2020 | 15 | 98 |
| 0 | 1035 | 2 | 0 | 38 | 2 | 99 |

METHOD AND SYSTEM FOR CACHING NETWORK DATA

BACKGROUND OF THE INVENTION

1. Field of the Invention

The present invention relates to remote data access via a network. In particular, the invention relates to caching network data and a system for realizing the control thereof.

2. Description of the Related Art

In recent years, companies that offer services of Application Service Provider (ASP) type have appeared. The advantages of ASP are that client users' systems can be downscaled because the provider's data center holds all data in its databases or the like and the clients can use latest applications at low cost. The service-offering companies can integrate a plurality of clients' systems and reduce the investment in their ASP facilities. Further advantage is that the clients can reduce the data management cost because the data center performs data backup and related operations. From these advantages, a broad range of services of ASP type has lately been available, and so does in the sphere of medical information.

Technique for enabling such services for data stored on disk media, which is called ISCSI, has lately attracted attention. The iSCSI is a technique of passing SCSI commands which are disk input/output commands over a TCP/IP network. The iSCSI specifications are under discussion by a working group of the Internet Engineering Task Force (IETF) which is a community for establishing standards and specifications on the Internet and the draft-level ISCSI specifications have so far been published. One of the available storage products supporting the iSCSI protocol is IBM Total Storage IP Storage 200i supplied by IBM Corporation, US.

Using the iSCSI makes the following possible: a disk that is located at the data center and connected to a client via a LAN or other communications lines seems to the client just like a local disk directly connected to the client's system. The advantages of the ASP are also true for the storage system using the iSCSI. The clients need not install large-capacity storage units in their system and can entrust data management such as backup to the data center, and thus can reduce the management cost. Migration of storage units such as disks included in the system that was run completely under the management of a client to the data center is possible without changing the existing application programs and the client can benefit from the reduced management cost. The manner in which businesses offer such storage management services is called a Storage Service Provider (SSP).

Meanwhile, one problem with the ASP and SSP is that the time from a data request until the data is received may be long due to communication delay as communication takes place between a client and the server for each transaction. Particularly in the sphere of medical information, large amounts of image data such as CT and MRI are often requested and communication delay becomes considerable. To hide communication delay, caching the data to be communicated is generally effective. However, using caches is effective for hiding communication delay only if cached data is reused, but ineffective when data is referenced just once.

As a method for hiding communication delay for data that is referenced just once, a prefetch cache method is known. For example, JP Serial No. 3074535 disclosed a method for hiding data access delay in which prefetch caches based on scheduling are used in a medical information system.

However, it is difficult to apply the method of hiding delay using prefetch caches to existing applications. This is because a prefetch program is provided separately from the existing applications and cached data is preserved in another application program than the existing applications. Accordingly, the existing applications determine whether data to access has been prefetched when accessing data and receive the data from the prefetch program if the data has been prefetched; if not, the applications must branch to request the OS to read or write the data.

In the method of hiding delay using prefetch caches, cached data is preserved in another application program than the existing applications. Therefore, it is difficult to apply this method to the existing applications.

SUMMARY OF THE INVENTION

It is an object of the present invention to provide means for caching data that is transmitted and received via a network, according to the iSCSI protocol or the like, in order to hide data access delay involved in transmission over the network. It is another object of the present invention to provide means for discriminating between data cached and data not cached in a manner transparent to the application programs. This is intended to make the following possible: even after the introduction of caching by the prefetch program in environment where the application programs have already been run, the existing programs can get cached data by simply requesting the OS to read or write data, following the conventional way of data request.

It is a further object of the present invention to provide means for controlling the caching operation from another system than the system that performs caching.

Hiding data access delay noted above is accomplished by means for caching data on a device driver level in a client system and means for storing cached data into an external storage unit. The device driver is software for coordinating difference in hardware and providing the OS with a common procedure for accessing the devices in the system. The devices referred to herein include disk interfaces and a network interface.

Cache control noted above is accomplished by means for sending cache control commands such as "flush the cache" to the client from the outside of the client and means for executing received cache control commands within the client.

According to the present invention, data access delay over a network in carrying out data transmission/reception via the network can be hidden. Discrimination between data cached and data not cached can be made transparent to the application programs. There is an advantage that even after the introduction of caching by a prefetch program or the like in a client system, the existing programs on the client system can make use of cached data by simply requesting the OS to read or write data, following the conventional way of data request. Moreover, another advantage is that the caching operation can be controlled from another system than the system in which caching is performed.

Other and further objects, features and advantages of the invention will appear more fully from the following description.

DETAILED DESCRIPTION OF THE PREFERRED EMBODIMENTS

A preferred Embodiment 1 of the present invention will now be described, using FIGS. 1 to 5. First, a general procedure using iSCSI as the communication protocol will be described, then, how the device driver of a client system caches data, which is the subject of the present invention, will be described.

Figure 2:
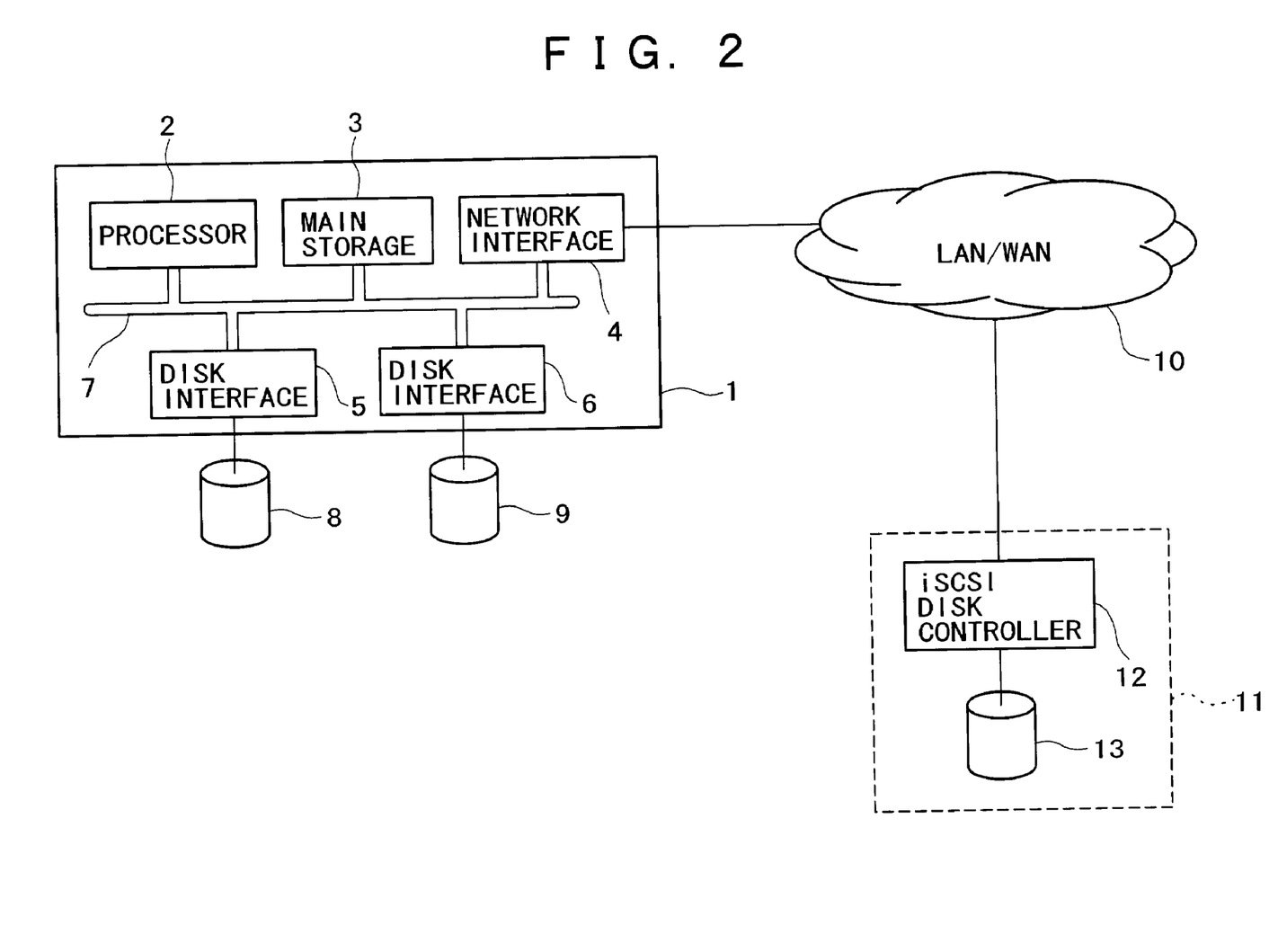
FIG. 2 illustrates an example of network architecture for telecommunication between a client system and an iSCSI-compliant disk system.

FIG. 2 shows an example of network architecture for telecommunication between a client system 1 and an iSCSI-compliant disk system 11. The hardware configuration of the client system 1 is the same as a general-purpose computer system on which an OS such as Windows or UNIX runs. That is, the client system is configured with a processor 2, main storage 3, a network interface 4, and disk interfaces 5 and 6 and these components are interconnected by an internal bus 7. The disk interfaces 5 and 6 are connected to disk units 8 and 9, respectively.

On the disk unit 8, the OS, application programs, a device driver, and other programs are recorded. Upon the power-on of the client system 1, these programs are read into the main storage 3 and executed by the processor 2 and disk interface 5 as required.

The network interface 4 is connected to the iSCSI-compliant disk system 11 via a LAN or WAN 10. The present invention is also applicable to cases where a repeater such as a router or a hub is used in the LAN or WAN. The repeater role is excluded from the description herein because it does not influence the operation of the preferred embodiment.

The iSCSI-compliant disk system 11 has an iSCSI disk controller 12 which is connected to a disk unit 13. The present invention is also applicable to cases where the disk system includes a plurality of disk units, which, however, does not influence the operation of the preferred embodiment. Thus, the case where the disk system has one disk controller is illustrated in this embodiment.

Figure 3:
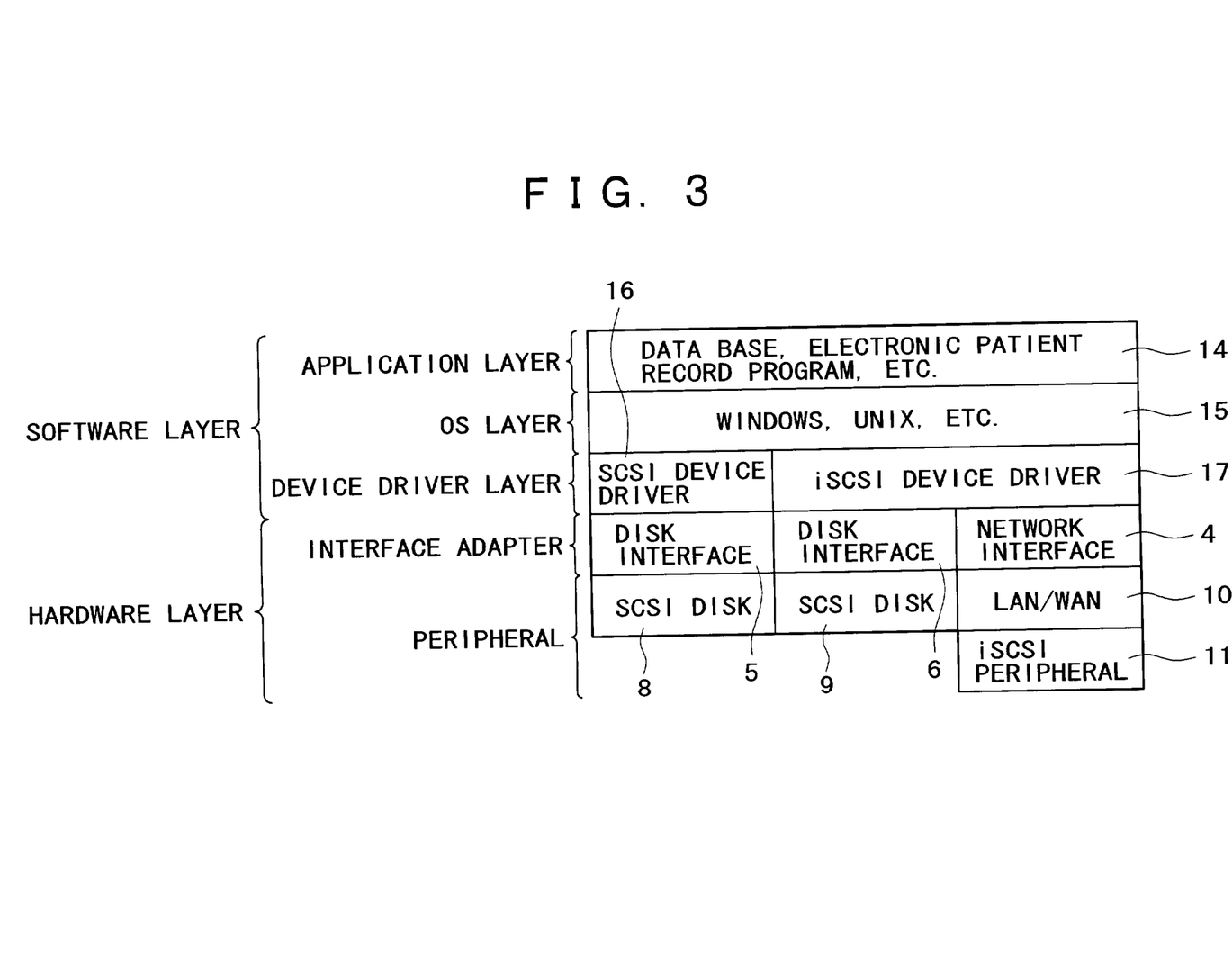
FIG. 3 illustrates an example of structure of software hierarchies and hardware hierarchies of the client system.

FIG. 3 shows software hierarchies and hardware hierarchies of the client system 1. The components in the hardware hierarchies correspond to the components shown in FIG. 2. Data is exchangeable between the upper and lower hierarchies in contact with each other.

First, general SCSI disk input/output operation will be described. When writing data to a disk from an application layer 14, a request for input to the disk is first delivered to an OS layer 15. The OS passes data (a command to write data and data to write) necessary for executing the input to the disk in a hardware-device-independent form to a SCSI device driver 16. The SCSI device driver 16 converts the write command and data received from the OS into a form pursuant to the I/O specifications specific to the disk interface 5. When the SCSI device driver 16 writes the write command and data to the disk interface, the disk interface is activated. Then, the SCSI command of write request with the data to write is sent to the disk unit 8 and writing the data to the disk is performed.

When the application layer is to read data, a request for output from disk is sent to the disk unit 8 in the same procedure as described for the request for input to disk. Data output from the disk unit 8 is sent back to the application layer in the reverse procedure to the above procedure and a data read sequence is completed.

Then, general input/output operation by issuing request for input/output to the iSCSI disk controller 12 will be described. When writing data to a disk from an application layer 14, a request for input to the disk is first delivered to the OS layer 15. The OS passes data (a command to write data and data to write) necessary for executing the input to the disk in a hardware-device-independent form to an iSCSI device driver 17.

The iSCSI device driver's interface configuration such as parameters interfacing with the OS is the same as that of the ordinary SCSI device driver. Thus, the OS passes the same data to the iSCSI device driver as the data it passes to the SCSI device driver. For the same reason, it appears to the OS that a disk unit to access with the iSCSI protocol and a disk unit to access with the SCSI protocol are the same type ones.

The ISCSI device driver 17 converts the write command and data received from the OS into a command format pursuant to the ISCSI specifications. By sending the iSCSI command through the network interface 4 and via the LAN/WAN to the iSCSI-compliant disk system 11, writing the data to the disk is performed.

Details on the iSCSI commands to be exchanged via the LAN/WAN are under discussion by a working group of the Internet Engineering Task Force (IETF) which is a community for establishing standards and specifications on the Internet and the draft-level iSCSI specifications have so far been published.

When the application layer is to read data, a read request is sent to the iSCSI-compliant disk system 11 in the same procedure as described for the request for input to disk. Data output from the iSCSI-compliant disk system 11 is sent back to the application layer in the reverse procedure to the above procedure and a data read sequence is completed.

How the device driver caches data, which is the subject of the present invention, will now be explained.

Figure 4:
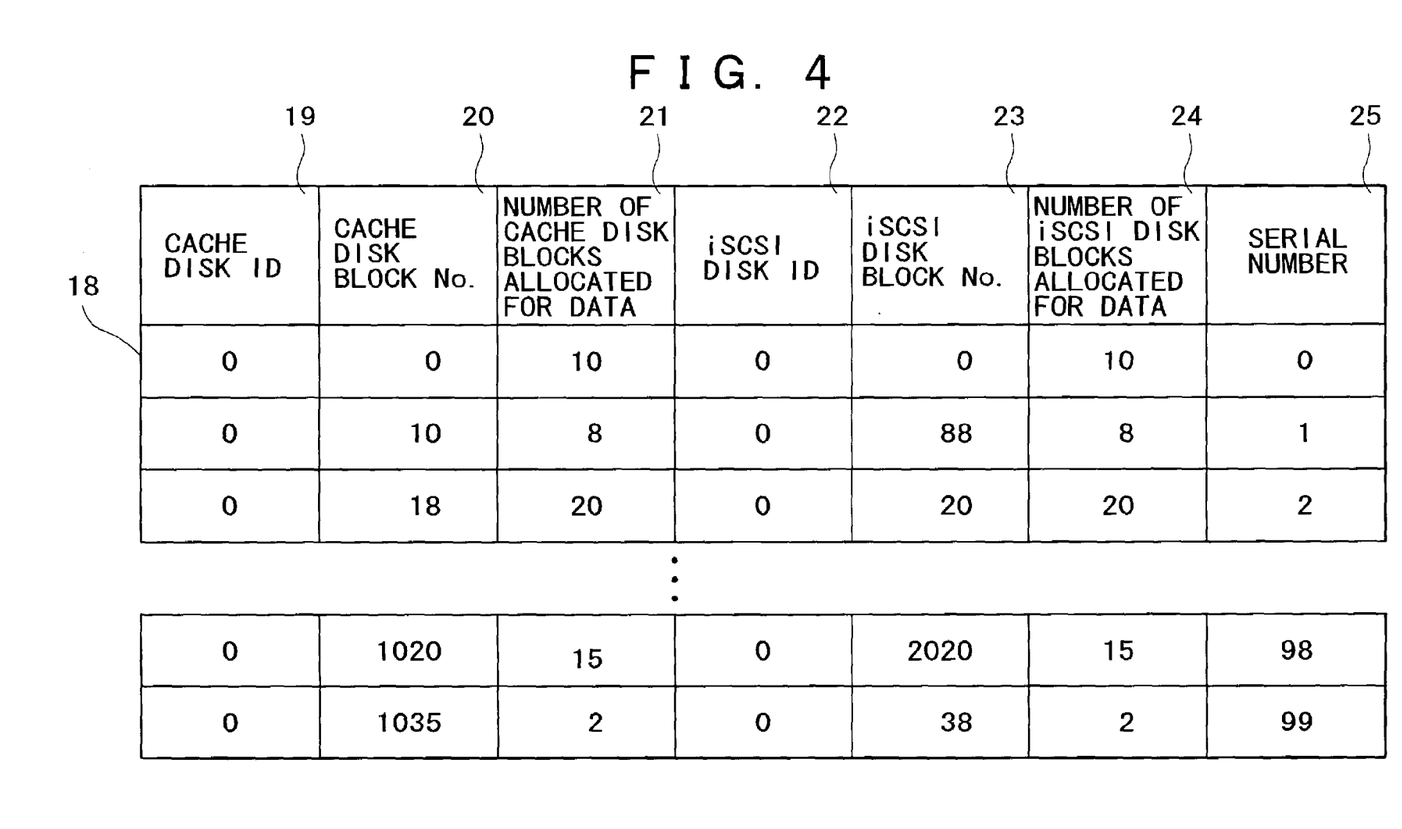
FIG. 4 illustrates an example of structure of a cache management table.

Data to cache is stored to the disk unit as a cache 9 which is another disk unit than the disk unit 8 having the OS, application programs, device driver, and other programs recorded thereon (FIG. 2). Determination as to whether data once read resides on the cache is made, using a cache management table 18 stored in the main storage 3 of the client system 1. FIG. 4 shows the structure of the cache management table.

Generally, the recording space within a disk unit is divided into blocks of equal size and block numbers are assigned to the blocks as block identifiers. Therefore, when inputting and outputting data, a block number to locate the data and the number of blocks to designate the length of the data are specified.

According to the above input and output method, the cache management table 18 holds a set of a cache disk identifier (ID) 19, a cache disk block number 20, the number of cache disk blocks allocated for data 21, an iSCSI disk identifier (ID) 22, an iSCSI disk block number 23, the number of iSCSI disk blocks allocated for data 24, and a serial number 25.

The cache management table 18 is generated when the client system 1 is initialized. Immediately after the initialization of the client system, the table is empty. This means that no data has been cached. Each time data is cached, one set of entries is generated.

The first row of the table in FIG. 4 indicates that data of 10 blocks from block number 0 in the iSCSI disk is stored into the area of 10 blocks from block number 0 in the cache disk. The second row of the table indicates that data of eight blocks from block number 88 in the iSCSI disk is stored into the area of eight blocks from block number 10 in the cache disk. The cache disk identifier and iSCSI disk identifier are used to identify a disk unit if a plurality of cache disks and a plurality of iSCSI disks are employed. Because one cache disk and one iSCSI disk are employed in the present preferred embodiment, the identifier fields contain 0.

Figure 1A:
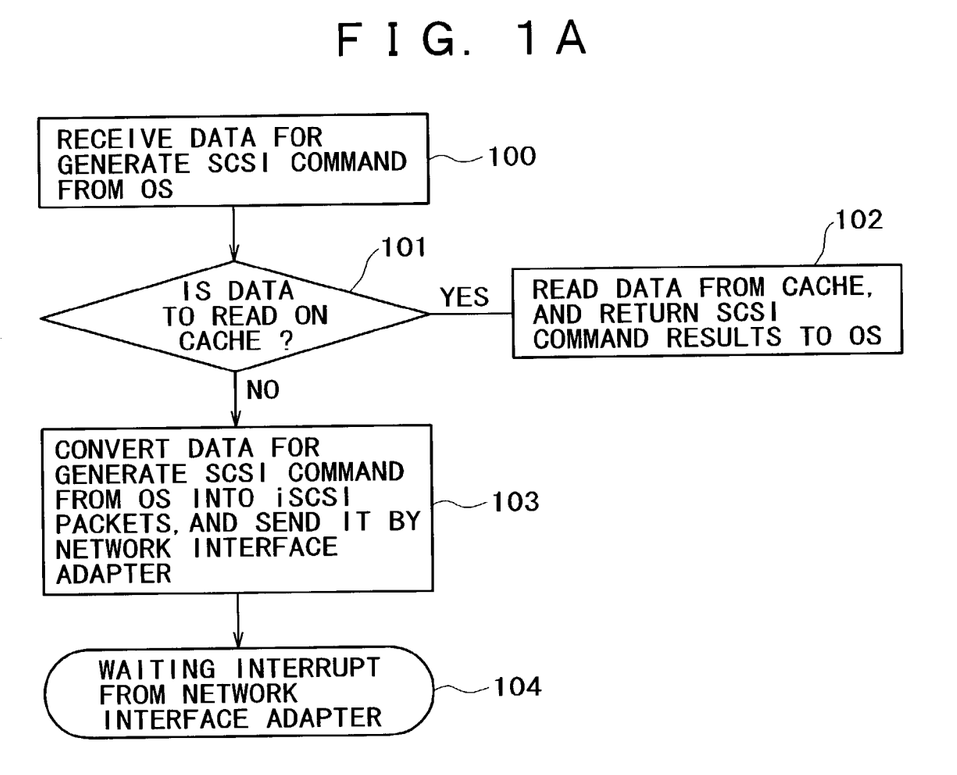
FIG. 1A is a flowchart of ISCSI device driver operation when reading data from a remote iSCSI-compliant disk system.

FIG. 1A shows a flowchart of iSCSI device driver operation when reading data from a remote iSCSI-compliant disk system. Receiving a request to read data issued from the OS, from which a SCSI command to read data is generated, the iSCSI device driver determines whether the data to read from the blocks specified in the request is on the cache disk 9 by referring to the above cache management table 18 (101). If the above data to read is on the cache disk 9, the iSCSI device driver reads the data from the cache disk unit 9, using the disk interface 6, and returns the data to the OS (102).

If the above data to read is not on the cache disk 9, the iSCSI device driver converts the request to read data (in the SCSI command form) received from the OS into an iSCSI-specifications-compliant packet of read command and sends the iSCSI command packet to the iSCSI-compliant disk system 11 through the network interface 4 and via the LAN/WAN 10 (103).

Figure 1B:
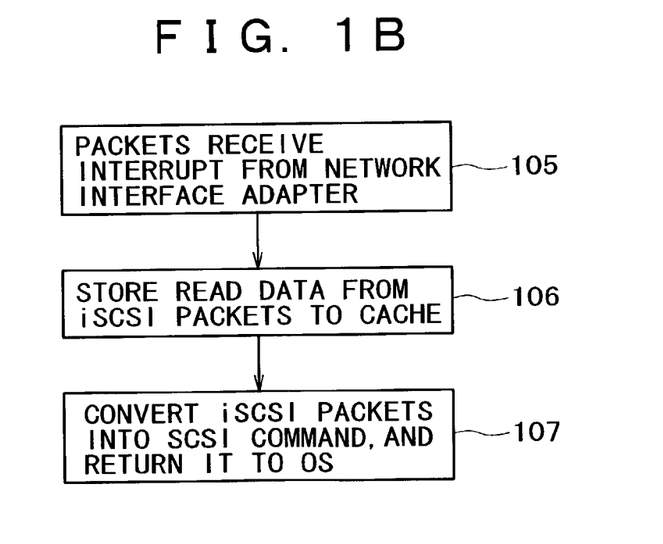
FIG. 1B is a flowchart of a process that the iSCSI device driver caches data received from the remote disk system.

Upon the arrival of data packets from the iSCSI-compliant disk system 11, a packets-receiving interrupt is generated from the network interface 4 (105) (FIG. 1B). This interrupt activates the iSCSI device driver again and the iSCSI device driver stores the read data from the received packets to the cache disk and adds new entries about the data to the cache management table (106). The iSCSI device driver converts the iSCSI command from the received packets into a normal SCSI command and returns the SCSI command to the OS (107). Through the above operation sequence, a read action when the data to read is not on the cache disk 9 is completed.

Figure 5:
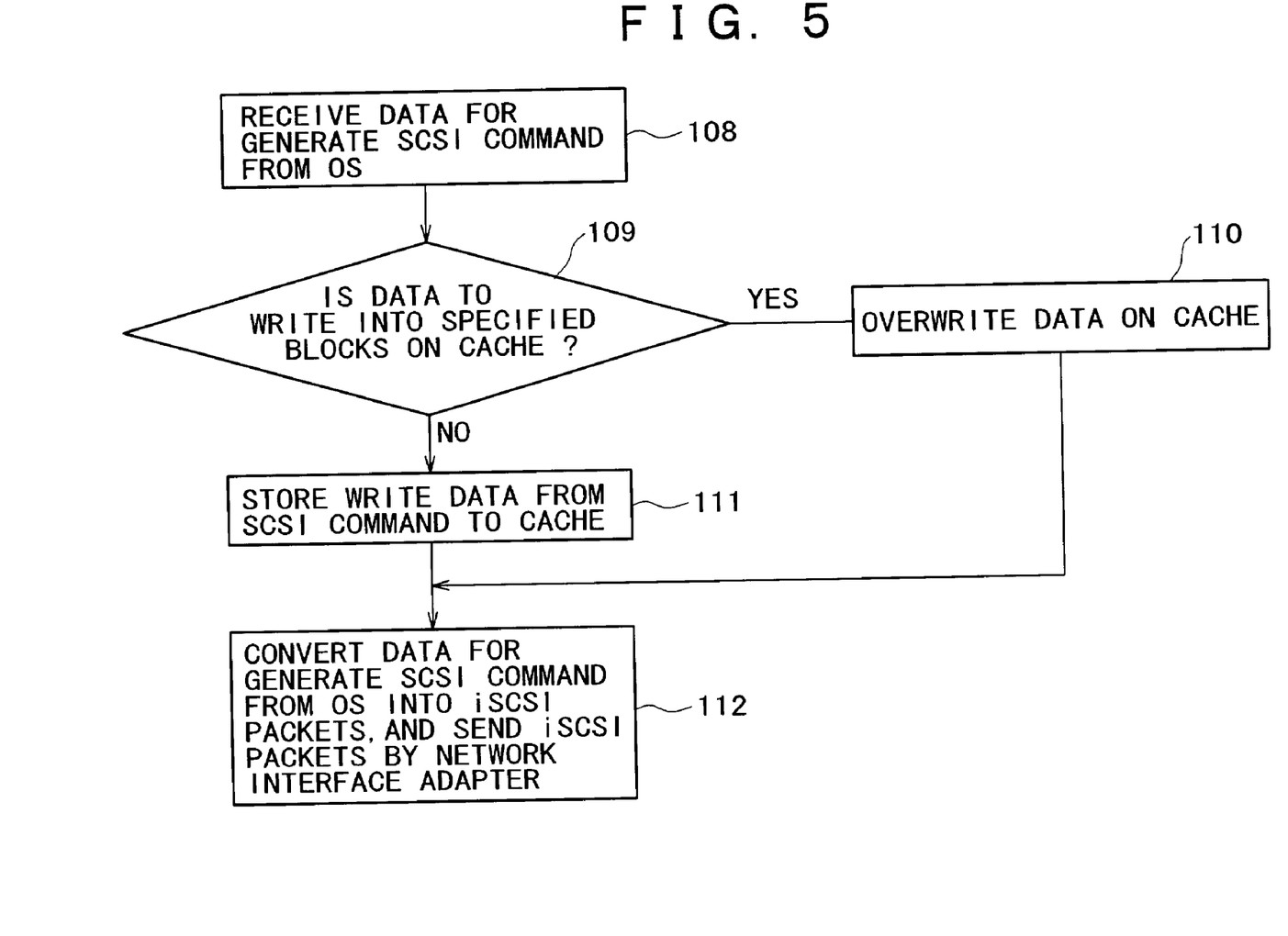
FIG. 5 is a flowchart of iSCSI device driver operation when writing data.

FIG. 5 shows a flowchart of iSCSI device driver operation when writing data to a remote iSCSI-compliant disk system. Receiving a request to write data issued from the OS, from which a SCSI command to write data is generated, the iSCSI device driver determines whether the data to write into the blocks specified in the request is on the cache disk 9 by referring to the cache management table 18 (109). If the above data to write is on the cache disk 9, the iSCSI device driver overwrites that data on the cache disk 9, using the disk interface 6 (110). If the above data to write is not on the cache disk 9, the iSCSI device driver stores that data to the cache disk and adds new entries about that data to the cache management table (111).

In either case, the iSCSI device driver converts the request to write data (in the SCSI command form) received from the OS into iSCSI-specifications-compliant packets of write command. The ISCSI device driver sends the iSCSI command packets to the iSCSI-compliant disk system 11 through the network interface 4 and via the LAN/WAN 10 (112), thereby writing the data is performed.

By following the above-described procedures in carrying out data transmission/reception via a network, data access delay over the network can be hidden. Discrimination between data cached and data not cached can be made transparent to the application programs. Even after the introduction of caching by a prefetch program or the like in a client system, the existing programs on the client system can make use of cached data by simply requesting the OS to read or write data, following the conventional way of data request.

In the above-illustrated embodiment, the write action is carried out so that data to write requested from the application layer is immediately written to the iSCSI-compliant disk system 11. In the alternative, in some implementations it may be possible that the write action takes place after an elapse of time of any period for cases where the LAN/WAN circuits are occupied or make connection for specified duration only.

To implement such deferred write action, a "not transmitted" flag column is added to the cache management table 18. Unless data is immediately written to the iSCSI-compliant disk system 11, the iSCSI device driver sets the "not transmitted" flag on when generating entries or updating the entries of the cache management table 18. In consequence of monitoring the LAN/WAN circuits by a time or the like, once transmission via one of these circuits has become enabled, all the data with the "not transmitted" flag being on is transmitted at a time. In this way, the write action is carried out after an elapse of time of any period.

In the above-illustrated embodiment, when the cache disk becomes full and there remains no space for storing new data, the oldest cached data is deleted and new data is cached. This method is what is called FIFO (first-in first-out) that is generally used for cache control. Serial numbers in the serial number 25 column of the cache management table 18 indicate the order in which the entry set for each data was generated, and, using these numbers, the oldest cached data can be determined. That is, when the cache disk 9 becomes full, the entry set assigned the youngest serial number 25 is looked for, new data is stored into the area of the cache disk 9 designated by the cache disk block number in the entry set, and a new set of entries is added to the table with the deletion of the entry set.

In addition to the FIFO method, in some implementations it may be also possible to manage the cache in such a manner that data in a specified area in the iSCSI-compliant disk system 11 is resident on the cache disk 9 without being deleted from the cache disk 9. To implement this, a "resident on cache" flag column is added to the cache management table 18. If the "resident on cache" flag is set on for an entry set for data, the data is treated as exception to data deletion from the cache by FIFO. In this way, it is possible to make particular data resident on the cache.

A preferred Embodiment 2 of the present invention will now be described.

In Embodiment 2, the interface for connection of the client system to the iSCSI-compliant disk system includes the interface to the cache disk.

Figure 6:
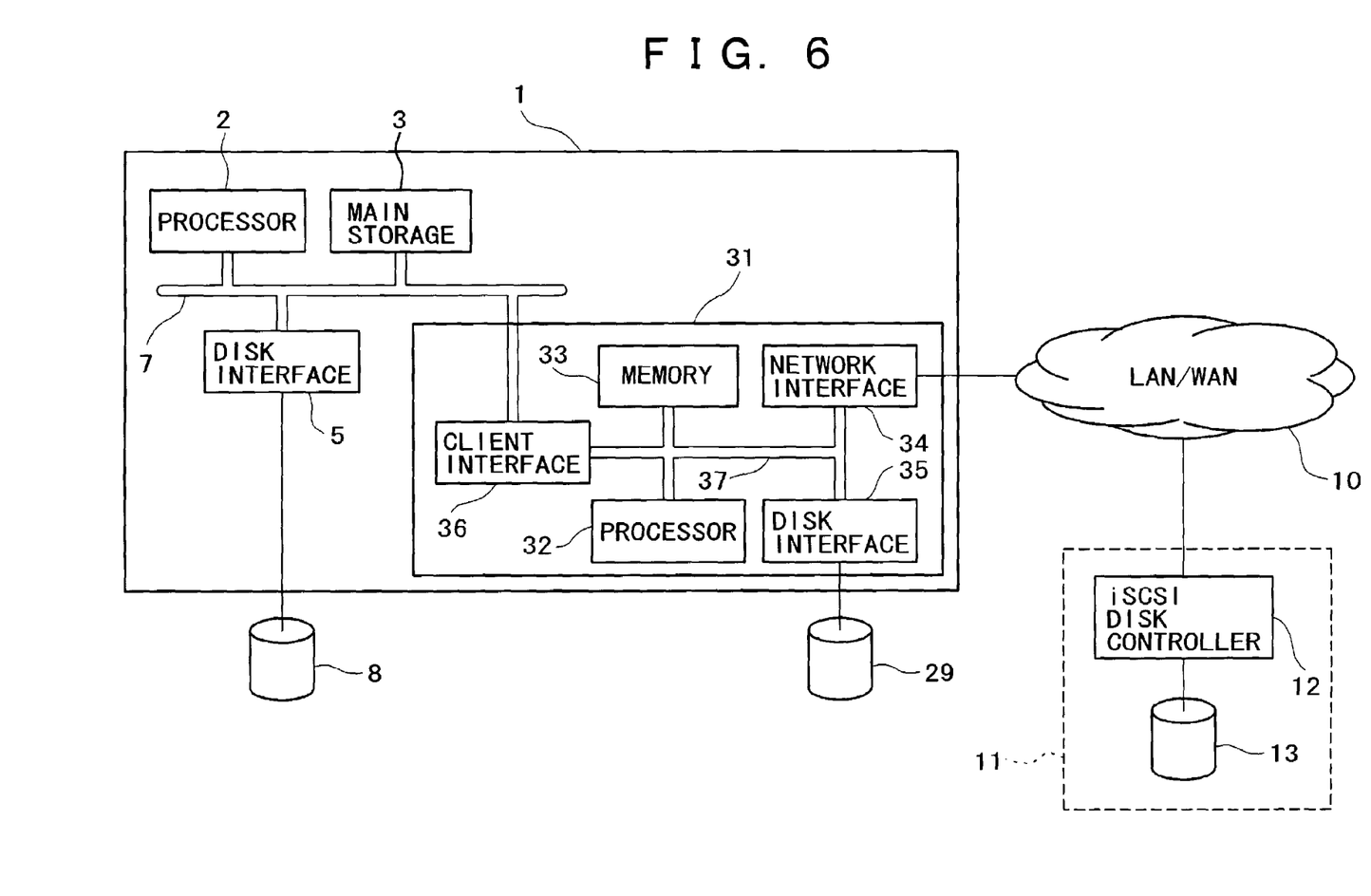
FIG. 6 illustrates another example of network architecture for telecommunication between a client system and an iSCSI-compliant disk system.

FIG. 6 shows another example of network architecture for telecommunication between the client system 1 and the iSCSI-compliant disk system 11 according to Embodiment 2.

As is in Embodiment 1, the hardware configuration of the client system 1 of Embodiment 2 is the same as a general-purpose computer system on which an OS such as Windows or UNIX runs. That is, the client system is configured with a processor 2, main storage 3, and a disk interface 5 which are interconnected by an internal bus 7. The disk interface 5 is connected to a disk unit 8.

On the disk unit 8, the OS, application programs, a device driver, and other programs are recorded. Upon the power-on of the client system 1, these programs are read into the main storage 3 and executed by the processor 2 and disk interface 5 as required.

The client system also includes an iSCSI disk interface 31 that is configured with a processor 32, memory 33, network interface 34, disk interface 35, and client interface 36 which are interconnected by an internal bus 37. The disk interface 35 is connected to a disk unit 29. The operation of the iSCSI disk interface 31 is controlled under a control program in the memory 33 executed by the processor 32.

The client interface is circuitry for controlling input and output to/from the client system 1 and have various types of registers, interrupt signal lines, and other components that are configured in the same structure as for the conventional disk interface 5 or the like. Thus, it appears to the client system 1 that the iSCSI disk interface 31 is the same as the conventional disk interface 5 or the like. Accordingly, the device driver for the conventional disk interface is used as is in the client system 1. That is, the iSCSI disk interface 31 exchanges data with the device driver installed in the client system 1.

In Embodiment 2, because the conventional device driver is used, the device driver is not engaged in caching operation. Instead, caching operation is carried out within the iSCSI disk interface 31. Thus, the cache management table 18 described in Embodiment 1 is stored in the memory 33 of the iSCSI disk interface 31.

Figure 7A:
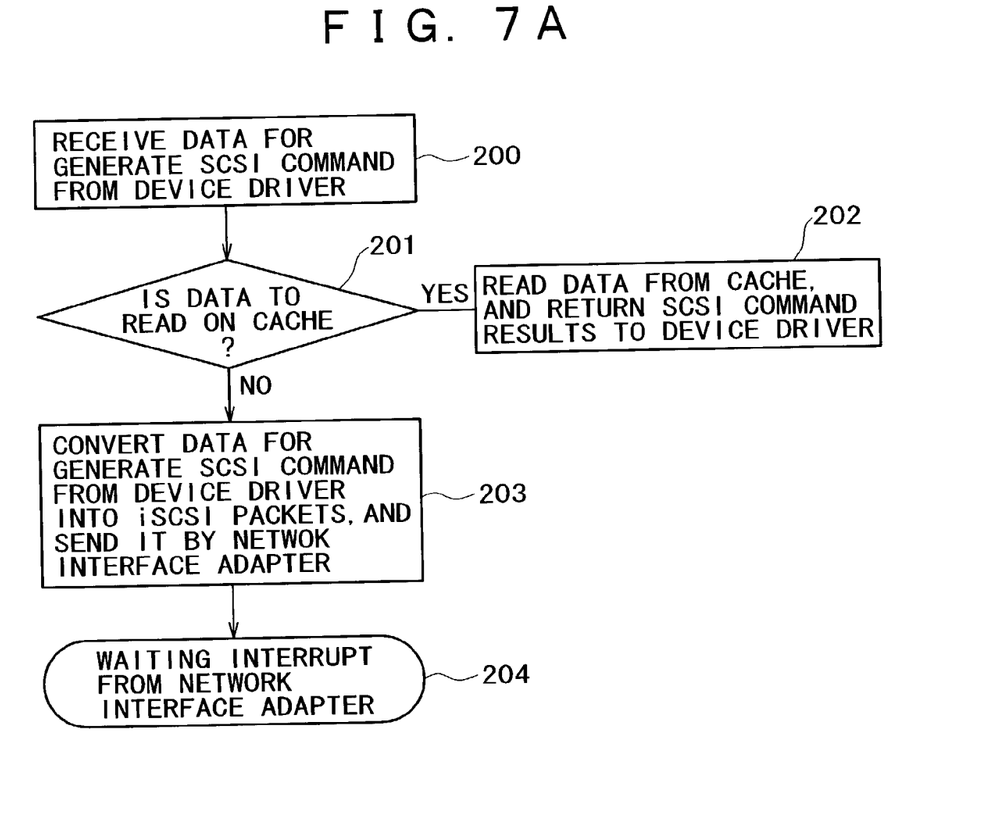
FIG. 7A is a flowchart of iSCSI disk interface operation when reading data from a remote iSCSI-compliant disk system.

FIG. 7A shows a flowchart of operation of the iSCSI disk interface 31 when reading data from a remote iSCSI-compliant disk system.

Receiving a request to read data issued from the device driver, from which a SCSI command to read data is generated, the iSCSI disk interface 31 determines whether the data to read from the blocks specified in the request is on the cache disk 29 by referring to the cache management table (201). If the above data to read is on the cache disk 29, the iSCSI disk interface reads the data from the cache disk unit 29, using the disk interface 35, and returns the data to the device driver (202).

If the above data to read is not on the cache disk 29, the iSCSI disk interface converts the request to read data (in the SCSI command form) received from the device driver into an iSCSI-specifications-compliant packet of read command and sends the iSCSI command packet to the iSCSI-compliant disk system 11 through the network interface 34 and via the LAN/WAN 10 (203).

Figure 7B:
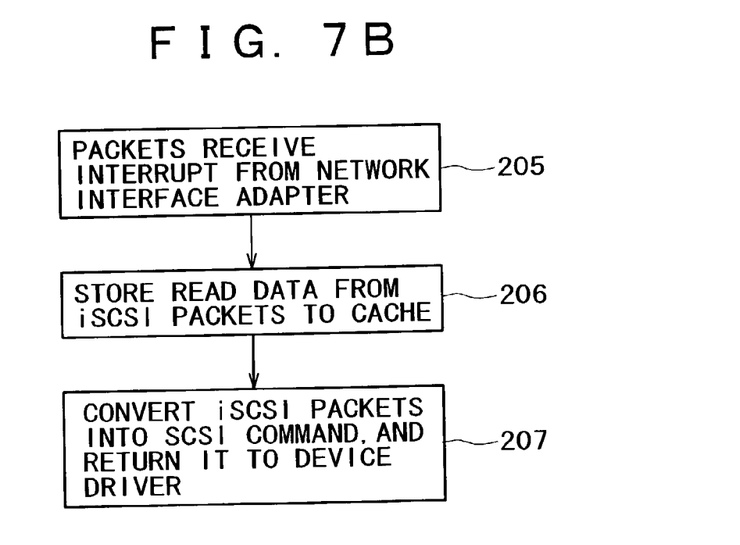
FIG. 7B is a flowchart of a process that the iSCSI disk interface caches data received from the remote disk system.

Upon the arrival of data packets from the iSCSI-compliant disk system 11, a packets-receiving interrupt is generated from the network interface 34 (205) (FIG. 7B). This interrupt activates the process again and the iSCSI disk interface stores the read data from the received packets to the cache disk and adds new entries about the data to the cache management table (206). The iSCSI disk interface converts the iSCSI command from the received packets into a normal SCSI command and returns the SCSI command to the device driver (207). Through the above operation sequence, a read action when the data to read is not on the cache disk 29 is completed.

Figure 8:
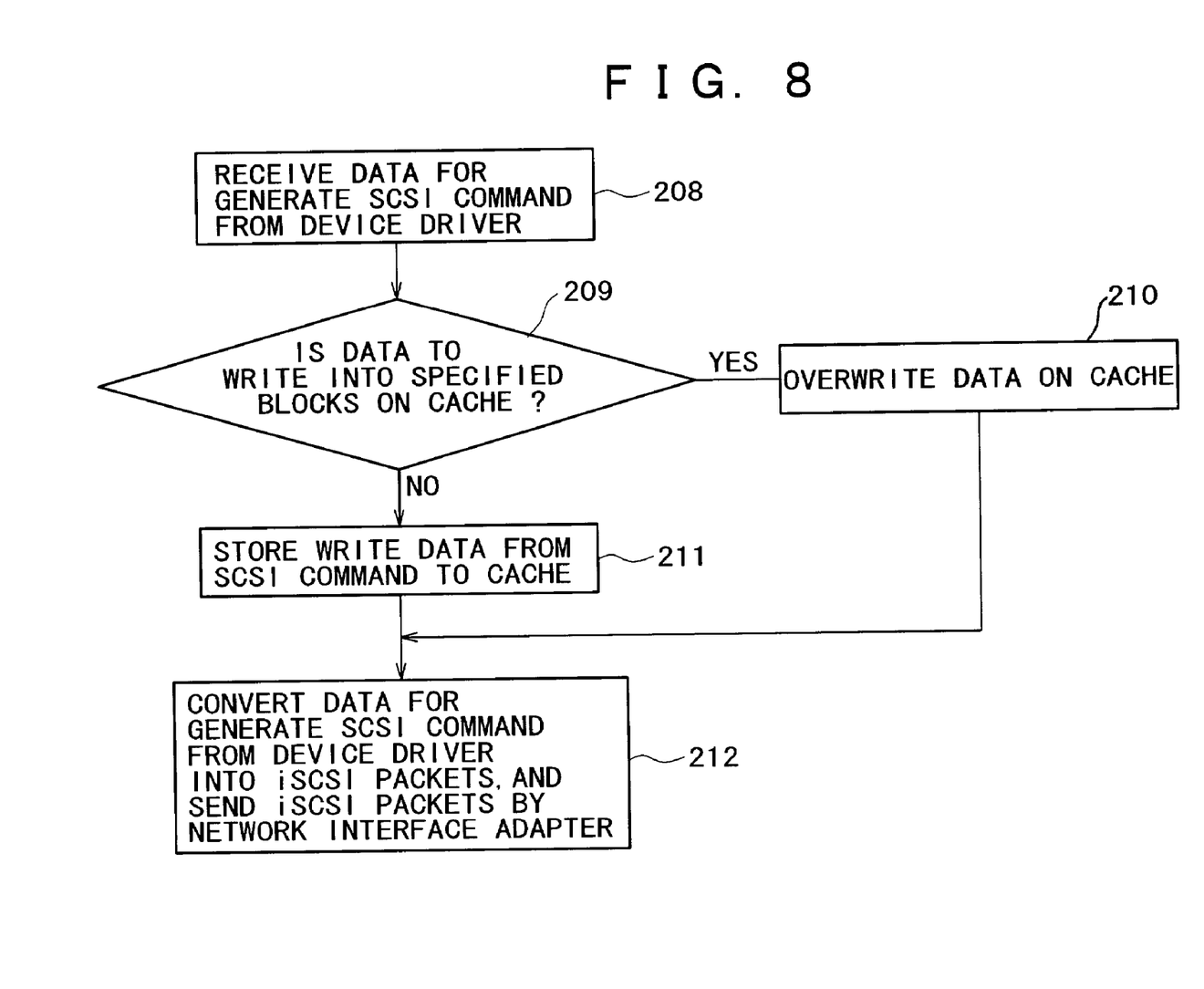
FIG. 8 is a flowchart of iSCSI disk interface operation when writing data.

FIG. 8 shows a flowchart of operation of the iSCSI disk interface 31 when writing data to a remote iSCSI-compliant disk system.

Receiving a request to write data issued from the device driver, from which a SCSI command to write data is generated, the iSCSI disk interface 31 determines whether the data to write into the blocks specified in the request is on the cache disk 29 by referring to the cache management table (209). If the above data to write is on the cache disk 29, the iSCSI disk interface overwrites that data on the cache disk 29, using the disk interface 35 (210). If the above data to write is not on the cache disk 29, the iSCSI disk interface stores that data to the cache disk and adds new entries about that data to the cache management table (211).

In either case, the ISCSI disk interface converts the request to write data (in the SCSI command form) received from the device driver into iSCSI-specifications-compliant packets of write command. The iSCSI disk interface sends the iSCSI command packets to the iSCSI-compliant disk system 11 through the network interface 34 and via the LAN/WAN 10 (212), thereby writing the data is performed.

By following the above-described procedures in carrying out data transmission/reception via a network, data access delay over the network can be hidden. Discrimination between data cached and data not cached can be made transparent to the application programs. Even after the introduction of caching by a prefetch program or the like in a client system, the existing programs on the client system can make use of cached data by simply requesting the OS to read or write data, following the conventional way of data request.

Embodiment 2 also can be altered such that deferred write action of data from the client system to the iSCSI-compliant disk system 11 takes place after an elapse of time of any period and particular data is made resident on the cache, which can be implemented by the same procedures as mentioned above for Embodiment 1.

A preferred Embodiment 3 of the present invention will now be described.

In Embodiment 3, a method of controlling caching operation from another system than the client system 1 is illustrated.

Figure 9:
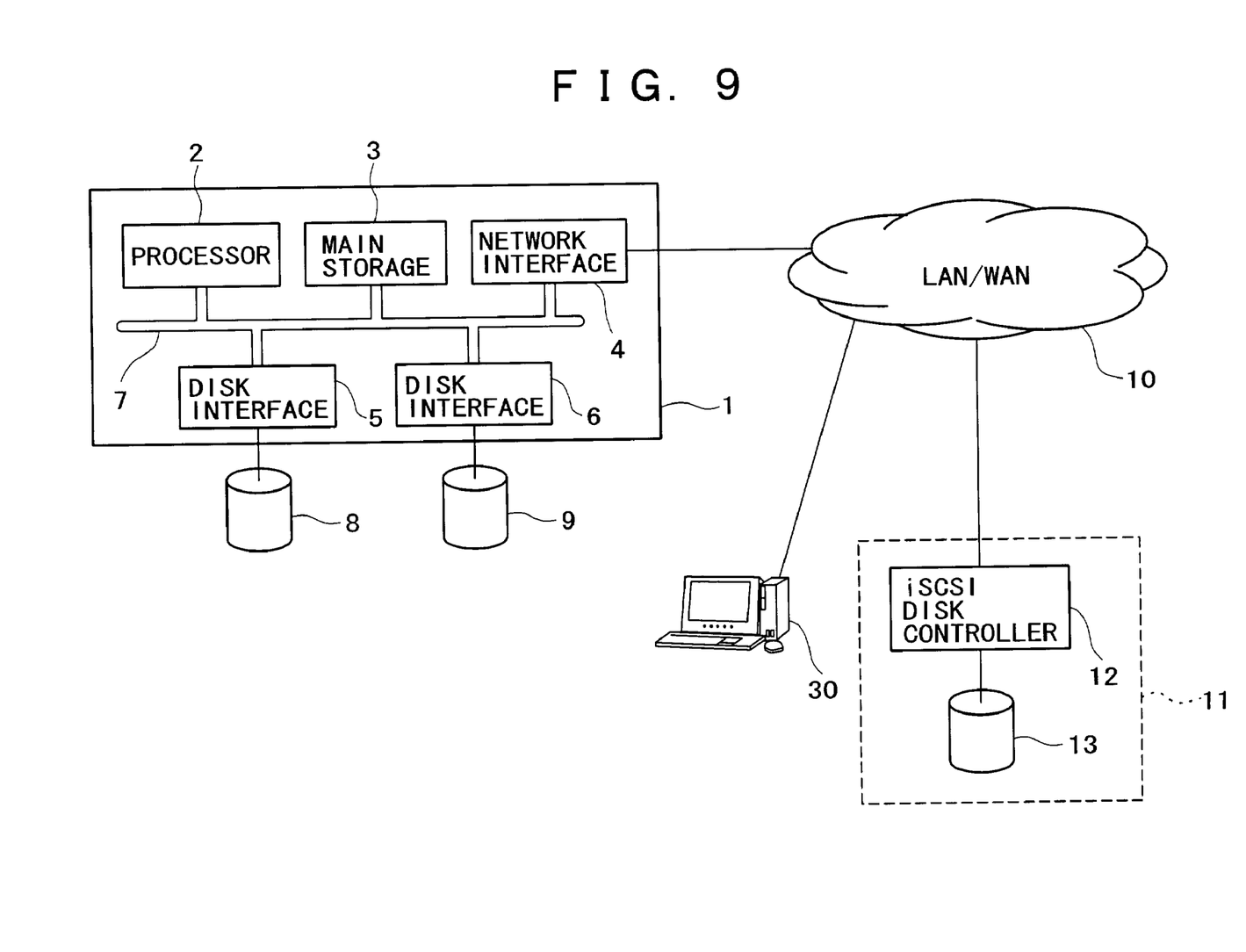
FIG. 9 illustrates a further example of the above network architecture in which caching operation is controlled from another system than the client system.

As alterations to Embodiments 1 and 2, some possible embodiments were mentioned in which deferred write action of data from the client system to the iSCSI-compliant disk system 11 takes place after an elapse of time of any period and particular data is made resident on the cache, and the specifics of such operation can be controlled from another system than the client system 1. FIG. 9 shows a further example of network architecture for enabling caching operation control from another system than the client system 1.

In this network architecture example, in addition to the architecture of Embodiment 1, a control computer 30 is connected to the LAN/WAN. The control computer 30 sends cache control commands to the client system 1 via the LAN/WAN.

The cache control commands are generated in a format distinguishable from iSCSI packets which are exchanged between the client system 1 and the iSCSI-compliant disk system 11. This allows the iSCSI device driver to discriminate between an iSCSI packet and a cache control command when it is activated by a packets-receiving interrupt generated from the network interface. If a cache control command is received, the iSCSI device driver operates, according to the command.

The following are examples of cache control commands that cause the iSCSI device driver to operate as will be described below.

(1) Flush the cache: an action to transmit all cached data that has not been transmitted to the iSCSI-compliant disk system 11. This action is carried out by the ISCSI device driver; specifically, it transmits all data with the "not transmitted" flag being on in the cache management table 18 to the iSCSI-compliant disk system. It is also possible to specify an iSCSI disk identifier in this command so that the cached data not transmitted to only the specified iSCSI disk will be transmitted.

(2) Stop transmission: an action to temporarily stop transmission of data that would be immediately transmitted to be written to the iSCSI-compliant disk system if during normal operation, which is essentially the same as the above-mentioned deferred write action to the iSCSI-compliant disk system 11 after an elapse of time of any period.

This action is carried out as follows. A transmission enable/disable parameter is to be stored in the main storage 3 of the client system 1. This parameter is set to a value that disables transmission when receiving the stop transmission command. Receiving a request to write data issued from the OS, the iSCSI device driver refers to this parameter. If the parameter is set at the value that disables transmission, the iSCSI device driver stores the data to transmit to the cache disk and sets the "not transmitted" flag on for that data in the cache management table 18. It is also possible to store an iSCSI disk identifier for which to stop transmission with the transmission enable/disable parameter so that data transmission to only the specified iSCSI disk is stopped temporarily.

(3) Restart transmission: an action to cancel the above stop transmission command. This action is put into effect by changing the transmission enable/disable parameter to a value that enables transmission when receiving the restart transmission command in the main storage 3 of the client system.

Although Embodiment 3 was described on the assumption that the network architecture is based on that of Embodiment 1, Embodiment 3 is also applicable to the network architecture of Embodiment 2. In the latter case, the control program of the iSCSI disk interface 31 instead of the iSCSI device driver implements the above actions. The above transmission enable/disable parameter is stored in the memory 33 of the ISCSI disk interface 31.

While all embodiments described hereinbefore assumed that commands to input and output data to/from the remote disk system are compliant with the iSCSI protocol and exchanged via the LAN/WAN network, it should be appreciated that the described embodiments are also applicable to cases where another protocol than iSCSI is used that can replace the protocol interruptible by the device driver.

While all embodiments described hereinbefore assumed that the cache disk 9 or 29 is separate from the disk 8 in which software OS is stored, it should be appreciated that the present invention can be carried out with only a single same disk unit.

In some embodiments, it is possible to use a common disk unit for both storage of software such as OS and cache storage. This can be embodied by allocating a cache area in advance on the disk in which software such as OS is stored and giving the information on the cache area extent to the device driver. The information on the cache area extent consists of a disk identifier allocated for cache, the start block number of the area allocated for cache, and the number of blocks allocated for the cache area. This information is stored in the main storage when the OS starts up and the iSCSI device driver reads this information. In this way, a common disk can be used for both storage of software such as OS and cache storage.

The foregoing invention has been described in terms of preferred embodiments. However, those skilled, in the art will recognize that many variations of such embodiments exist. Such variations are intended to be within the scope of the present invention and the appended claims.

What is claimed is:

1. A server system comprising a network interface, a secondary storage unit, a connection interface to the secondary storage unit, storage means for storing an OS and a device driver for said secondary storage unit, and a processor which runs said device driver and said OS, wherein, receiving a read request issued from said OS to read data, said device driver determines whether said data resides on said secondary storage unit;

if said data does not reside on said secondary storage unit, said device driver requests said network interface to transmit the read request outside of said secondary storage unit;

if said data resides on said secondary storage unit, said device driver requests said connection interface to read said data;

wherein, receiving a write request issued from said OS to write data, said device driver determines whether said data resides on said secondary storage unit;

if said data does not reside on said secondary storage unit, said device driver requests said network interface and said connection interface to transmit the write request to said secondary storage unit so as to write said data thereinto;

if said data resides on said secondary storage unit, said device driver requests said network interface to transmit said write request to said connection interface and requests said connection interface to overwrite said data on said secondary storage unit, and wherein said device driver directly operates physical devices to cache data without involving said OS.

2. A server system as recited in claim 1, wherein a management table resides on the server to retain entry mapping between a location within said secondary storage unit where data to write has once been stored at a write request of said OS, entry serial number, and a location within storage where said data is to be stored actually, and wherein said device driver generates said entry, if receiving the write request issued from said OS and said data does not reside on said secondary storage unit.

3. A server system comprising a network interface, a secondary storage unit, a connection interface to the secondary storage unit, a first storage means for storing an controlling program to control said network interface and said secondary storage unit, and a first processor which controls said controlling program, which are moduled, wherein said modules are connected to a second storage means which stores an OS and to a second processor which operates said OS, and said connection interface has an interface to exchange information between said first processor and said second processor, wherein said controlling program functions as an disc interface to said second processor and to said OS by exchanging information in-between, wherein, receiving a read request issued from said OS to read data, said control program determines whether said data resides on said secondary storage unit;

if said data does not reside on said secondary storage unit, said control program requests said network interface to transmit the read request outside of said secondary storage unit;

if said data resides on said secondary storage unit, said control program requests a connection interface to read said data; and wherein, receiving a write request issued from said OS to write data, said control program determines whether said data resides on said secondary storage unit;

if said data does not reside on said secondary storage unit, said control program requests said network interface and said connection interface to transmit the write request to said secondary storage unit so as to write said data thereinto;

if said data resides on said secondary storage unit, said control program requests said network interface to transmit said write request to said connection interface and requests said connection interface to overwrite said data on said secondary storage unit, and wherein said control program directly operates physical devices to cache data without involving said OS.

4. A method for controlling a server which comprises a network interface, a secondary storage unit, a connection interface to the secondary storage unit, storage means for storing a device driver for said secondary storage unit and an OS, and a processor which runs said device driver and said OS, said method comprising the steps of:

delivering a read request to read data from said OS to said device driver;

determining whether said data resides on said secondary storage unit, which is made by said device driver;

said device driver requesting said network interface to transmit the read request outside of said secondary storage unit without involving said OS, if said data does not reside on said secondary storage unit;

said device driver requesting said connection interface to read said data without involving said OS, if said data resides on said secondary storage unit;

delivering a write request to write data from said OS to said device driver;

determining by said device driver whether said data resides on said secondary storage unit;

requesting by said device driver that said network interface and said connection interface transmit the write request to said secondary storage unit so as to write said data thereinto without involving said OS, if said data does not reside on said secondary storage unit; and requesting by said device driver that said network interface transmits said write request to said connection interface and that said connection interface overwrites said data on said secondary storage unit without involving said OS, if said data resides on said secondary storage unit.

5. The server system according to claim 2, wherein if receiving a write request issued from said OS to write data, said data does not reside on said secondary storage unit, and said secondary storage unit has no space for storing new data, said device driver deletes an oldest entry based on a respective entry serial number to provide available space and requests said connection interface to write said data into said available space.

6. The server system according to claim 2, wherein if receiving a write request issued from said OS to write data, said data does not reside on said secondary storage unit, said secondary storage unit has no space for storing new data, and said entry has a resident on a cache flag, said device driver deletes an oldest entry of no resident on the cache flag to provide available space and requests said connection interface to write said data into said available space.

7. The server system according to claim 2, wherein, if receiving a write request issued from said OS to write data and said data does not reside on said secondary storage unit, said device driver requests said connection interface to transmit the write request and set a not-transmitted flag on said entry;

wherein, if receiving a write request issued from said OS to write data and said data resides on said secondary storage unit, said device driver requests said connection interface to overwrite said data and set a not-transmitted flag on said entry; and wherein said device driver requests said network interface to write data in said secondary storage unit which has a not-transmitted flag at a timing different from the write request issued from said OS.

8. The server system according to claim 2, wherein said device deriver has a set of a cache disk identifier and a cache disk block number, wherein, if receiving a read/write request issued from said OS to read/write data with one of the cache disk identifier and the cache disk block number, said device driver requests said network interface to read/write said data, and does not request said connection interface to read/write said data.

9. A server system as recited in claim 3, wherein a management table resides on a server to retain entry mapping between a location within said secondary storage unit where data to write has once been stored at a write request of said OS, an entry serial number, and a location within storage where said data is to be stored actually, wherein said control program generates said entry if receiving a write request issued from said OS to write data, and said data does not reside on said secondary storage unit.

10. The server system according to claim 9, wherein if receiving a write request issued from said OS to write data, said data does not reside on said secondary storage unit, and said secondary storage unit has no space for storing new data, said control program deletes an oldest entry based on a respective entry serial number to provide available space and requests said connection interface to write said data into said available space.

11. The server system according to claim 9, wherein if receiving a write request issued from said OS to write data, said data does not reside on said secondary storage unit, said secondary storage unit has no space for storing new data, and said entry has a resident on a cache flag, said control program deletes an oldest entry of no resident on the cache flag to provide available space and requests said connection interface to write said data into said available space.

12. The server system according to claim 9, wherein, if receiving a write request issued from said OS to write data and said data does not reside on said secondary storage unit, said control program requests said connection interface to transmit the write request and set a not-transmitted flag on said entry;

wherein, if receiving a write request issued from said OS to write data and said data resides on said secondary storage unit, said control program requests said connection interface to overwrite said data and set a not-transmitted flag on said entry; and wherein said control program requests said network interface to write data in said secondary storage unit which has a not-transmitted flag at a timing different from the write request issued from said OS.

13. The server system according to claim 9, wherein said control program has a set of a cache disk identifier and a cache disk block number, and wherein, if receiving a read/write request issued from said OS to read/write data with one of the cache disk identifier and the cache disk block number, said control program requests said network interface to read/write said data, and does not request said connection interface to read/write said data.

14. The server system according to claim 6, wherein said cache is operated in accordance with packet received from outside through said network interface, and said packet has an expanded architecture of packet of access request to said secondary storage unit through said network interface.

* * * * *